United States Patent [19]

Hurd

[11] 4,300,186
[45] Nov. 10, 1981

[54] SAFETY LIGHT

[76] Inventor: Wayne Hurd, 12700 N.W. 8 Ave., Miami, Fla. 33168

[21] Appl. No.: 116,146

[22] Filed: Jan. 28, 1980

[51] Int. Cl.$^3$ .......................................... B60Q 1/06
[52] U.S. Cl. ...................................... 362/66; 362/96; 362/385; 362/431; 362/450
[58] Field of Search ................... 362/66, 385, 96, 431, 362/450

[56] References Cited
U.S. PATENT DOCUMENTS 3,495,364  2/1970  De Bella ............................ 362/385

Primary Examiner—Stephen J. Lechert, Jr.
Attorney, Agent, or Firm—John Cyril Malloy

[57] ABSTRACT

A safety for use in combination with a motor vehicle comprising an elongate vertically extending telescoping member having a first segment connected between the floor and ceiling of a motor vehicle and a second segment vertically telescoping along the vertical axis having a top end comprising a light which is vertically swingable in relation to the vertical member. The device includes means for extending and compressing the telescoping second segment comprising a $CO_2$ compressed gas tank which may be hooked-up to the tubular support member to conduit means.

9 Claims, 2 Drawing Figures

SAFETY LIGHT

FIELD OF THE INVENTION

This invention relates to search lights, and more particularly, search lights which are connected to a telescoping support rod for extension and compression which is in turn connected to a motor vehicle.

BACKGROUND OF THE INVENTION

This invention comprises a high intensity, vertically extending tubular light which may be used to illuminate a designated area. The device is capable of lighting up a designated area for maximum visibility.

The light may be used by Federal, State and Local Agencies as well as the Highway Patrol, Boarder Patrol, Fire Departments, Fire And Rescue Squads, Ambulances, as well as firms such as the Electrical or Telephone Companies during night repair work or in any area where light is needed in a designated area.

SUMMARY OF THE INVENTION

A safety light comprising a tubular telescoping vertically extending support member having a first end connected to a motor vehicle and a second end having an illumination means comprising a search light. Electrical conduit means running through the tubular member for illuminating the illumination means, drive means for extending the tubular support member and means for extending and compressing the tubular support member. The second end being horizontally rotatable in relation to the vertical axis and the light being vertically swingable in relation to the horizontal axis.

DESCRIPTION OF THE PREFERRED EMBODIMENT

Figure 1:
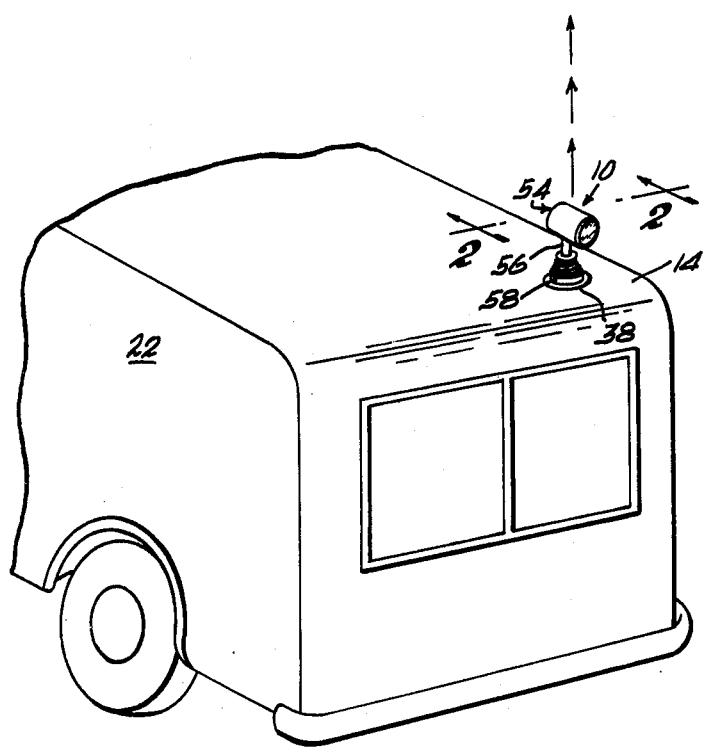
FIG. 1 is a perspective view of a partially cut-away motor vehicle having the safety light and showing the safety light in the compressed position.

Referring to the drawings wherein like reference characters designate like or corresponding parts throughout the several views and referring particularly to FIG. 1, there is shown the invention, a safety light, generally denoted by the numeral 10 in a compressed position in relation to the motor vehicle. As will be readily appreciated by those skilled in the art, the light 10 may be attached to the motor vehicle at the roof 14 of the motor vehicle 12 or in other suitable locations as will be more fully appreciated hereinafter.

Figure 2:
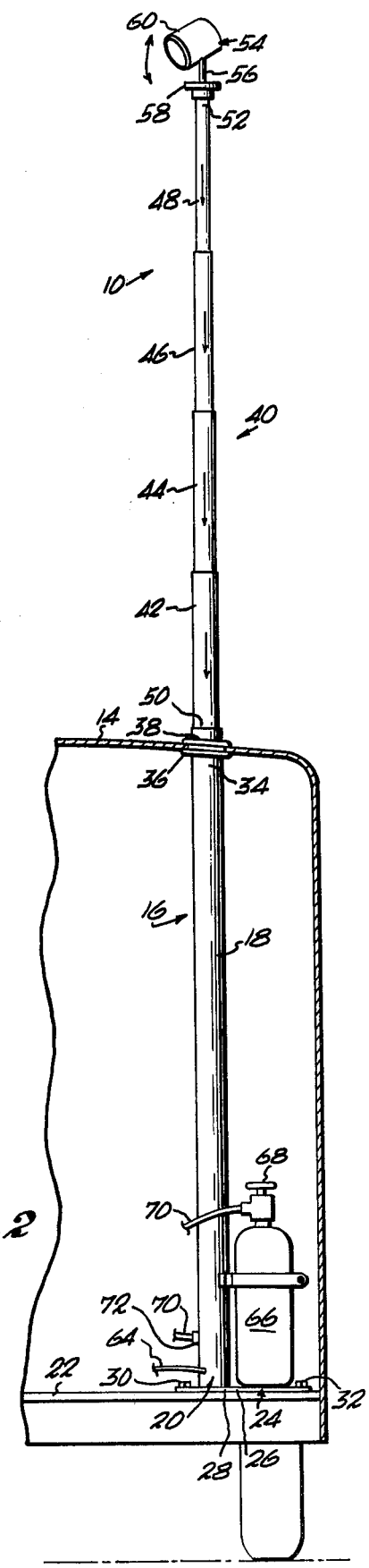
FIG. 2 is a cut-away view taken along line 2—2 of FIG. 1 showing the safety light in the extended position.

Referring particularly to FIG. 2, there is shown the invention 10, the safety light, in the extended position. The safety light includes an elongate vertically extending telescoping tubular support member generally denoted by the numeral 16 comprising a first segment 18 having a bottom end 20 which is fixedly connected with the floor of the motor vehicle 22. The motor vehicle may be provided with a support means such as that shown at 24 comprising the support base 26 and a mounting zone 28. The support base may be mounted to the floor 22 by a series of bolts such as at 30 and 32.

The first segment 18 includes a second end 34 which is fixedly connected to the roof 14 of the motor vehicle 22. The roof 14 includes a connection zone 36 comprising a washer inserted in the roof, having a center open zone 38 wherein the second end 34 of the first segment may be inserted.

The support member includes a second segment generally denoted by the numeral 40 comprising telescoping segments such as those shown at 42, 44, 46 and 48. The second segment is compressible to the roof 14 of the motor vehicle or extendible to a height of approximately 15 to 20 feet above the roof of the motor vehicle. The second segment includes a first end 50 connected to the top of the first segment 34. The second segment includes a second end 52 connected to an illumination means 54 which is horizontally rotatable at the top of the second segment.

The illumination means comprises a vertical member 56 having a first end 58 which is enlarged and shaped and sized to compatibly fit in smooth connection with the roof connection zone 36 and more particularly the center open zone 38 as can be seen more fully in FIG. 1. The illumination means includes a top end connected to the vertical member 56 and generally denoted by the numeral 60 comprising a light which is swingably connected to vertical member 60 and 62 such that the light may move in the direction indicated by the arrows as well as rotate horizontally as set forth previously. It has been found by applicant that efficiency and cost effectiveness can be achieved when the light makes a maximum of 70° angle with the vertical member.

It has also been found by the applicant that the best light for accomplishing the purpose as set forth herein is when the light is approximately 10" long, 8" high, and weighing between 5 and 10 pounds and having a candle power of 240,000 cp.

The light includes an electrical drive means for angling and rotating the light as set forth previously. Electrical conduit means 64 have been provided and extend throughout the tubular member for said purpose. Further, electrical conduit means also serve to supply the power to the illumination means, particularly the light and the conduit means 64 may be connected to a 12 volt energizer.

The device includes a first drive means for extending the second segment of the support member. That drive means may comprise a $CO_2$ cannister such as shown at 66 having a valve means 68 for releasing $CO_2$ into the tubular support member through conduit means 70 which are connected to the first segment of the tubular support means at 72. When it is desired for the second segment to be brought into the position shown at FIG. 1, the conduit means 70 is simply removed from connection 72 releasing the compressed gas and thus releasing the gas from the tubular support member allowing gravity to bring the light down to the position shown at FIG. 1 through the telescoping second segment.

While the instant invention has been shown and described herein in what is conceived to be the most practical and preferred embodiment, it is recognized that departures may be made therefrom, within the scope of the invention, which is therefore not to be limited to the details disclosed herein but is to be accorded the full scope of the claims so as to embrace any and all equivalent apparatus and articles.

I claim:

1. A safety light for use in combination with a motor vehicle to which said safety light is installed, and which vehicle has a floor; said safety light comprising:

an elongate vertically extending telescoping tubular support having a vertical axis and a top and a bottom end, said support being connected to the floor of a motor vehicle in a vertical attitude, means for illuminating a designated area fixedly connected to the top end of the support including mounting means for rotation of said means for illuminating with respect to the axis, said illumination means comprising a vertical member having a top end and a bottom end, the top end comprising a search light and the bottom end comprising said mounting means and including a connection zone for rotatably connecting the illuminating means to the top end of the support, and means swingably connecting said search light for rotation about an axis perpendicular to the axis of the vertical support, a first drive means for extending the support in a vertical direction along the vertical axis in relation to the vehicle, a second drive means for swinging and rotating the search light in relation to the vertical support, the tubular support including wiring means for the illumination means and second drive means; and means to electrically connect the second drive means and the illumination means to the electrical system of the motor vehicle.

2. The device as set forth in claim 1 wherein the tubular support includes a first segment having a bottom end fixedly connected to the floor of the motor vehicle and a top end connected to the motor vehicle at the roof, the roof including washer means wherein the top end of the elongate member is inserted, and a second segment comprising telescoping tubular segments vertically extending having a first end connected to the top end of the first segment and a second end connected to the illumination means, the second segment being fully compressible to the roof of the motor vehicle.

3. The device as set forth in claim 2 wherein the illumination means bottom end comprises an enlarged member fitting compatibly over the motor vehicle roof washer.

4. The device as set forth in claim 3 wherein the first drive means comprises a $CO_2$ tank having conduit means connected to the tubular support member for extending the second segment when $CO_2$ gas is applied to the tubular member and compressing the telescoping second segment of the tubular support member when the $CO_2$ gas is released.

5. The device as set forth in claim 4 wherein the illumination means comprises a search light of approximately 10" long, 8" high, and weighing between 5 and 10 pounds.

6. The device as set forth in claim 5 wherein the search light has candle power of 240,000 cp.

7. The device as set forth in claim 6 wherein the search light is vertically rotatable 70° in relation to the vertical support.

8. The device as set forth in claim 7 wherein the search light includes electrical means for illumination connected to the electrical conduit means comprising a 12 volt energizer.

9. The device as set forth in claim 8 wherein the second segment is approximately 15 to 20 feet in length when in the fully extended position.

* * * * *